(12) United States Patent
Sporre (10) Patent No.: US 6,193,238 B1
(45) Date of Patent: Feb. 27, 2001

(54) SEALING DEVICE (75) Inventor: Sten Sporre, Falkenberg (SE)

(73) Assignee: Forsheda AB, Forsheda (SE)

( * ) Notice: Subject to any disclaimer, the term of this patent is extended or adjusted under 35 U.S.C. 154(b) by 0 days.

(21) Appl. No.: 09/070,406

(22) Filed: Apr. 30, 1998

(30) Foreign Application Priority Data

May 7, 1997 (SE) .................................................. 9701639

(51) Int. Cl.⁷ ....................................................... F16J 15/10
(52) U.S. Cl. ........................ 277/609; 277/614; 277/616; 277/617
(58) Field of Search .................................... 277/607, 608, 277/609, 614, 617, 616; 285/230, 231, 375

(56) References Cited

U.S. PATENT DOCUMENTS

| | | | | |
|---|---|---|---|---|
| 856,106 | * | 6/1907 | Snow | 285/374 |
| 1,153,002 | * | 9/1915 | Wright | 277/607 |
| 1,982,044 | * | 11/1934 | Clark | 220/378 |
| 2,032,576 | * | 3/1936 | Hering | 285/374 |
| 2,229,587 | | 1/1941 | Parker . | |
| 2,966,539 | * | 12/1960 | Sears et al. | 174/35 R |
| 3,129,961 | * | 4/1964 | Danko et al. | 285/230 |
| 3,272,538 | * | 9/1966 | Bergstrom | 285/231 |
| 3,396,974 | | 8/1968 | Nord . | |
| 3,515,396 | * | 6/1970 | MacVaugh | 277/607 |
| 3,858,912 | * | 1/1975 | Bower | 285/230 |
| 4,182,519 | * | 1/1980 | Wilson | 277/616 |
| 4,496,176 | * | 1/1985 | Weinhold | 227/607 |

* cited by examiner

*Primary Examiner*—Anthony Knight
*Assistant Examiner*—Vishal Patel
(74) *Attorney, Agent, or Firm*—Baker & Daniels (57) ABSTRACT

A sealing device comprises two substantially conical or cylindrical sealing surfaces (6, 8) which are axially introducable one into the other to a substantially concentric sealing position in which the sealing surfaces define between themselves an annular sealing space (12) and further comprising a sealing element (10) consisting of elastic material, the sealing element being compressed in the sealing space between the sealing surfaces and being at least in axial direction bound to a first sealing surface of said sealing surfaces. The second sealing surface (8) is formed with at least one projection (16) and the sealing element forms in cooperation with said first sealing surface at least one pair of portions (20, 22) positioned adjacent each other in the axial direction and presenting different compression resistances under the influence of the projection of the second sealing surface. The projection (16) cooperates in the sealing position with the portion (20) of the sealing element having the smallest compression resistance, and the portion (22) of the sealing element having the greatest compression resistance is in the direction of introduction of the sealing surfaces one into the other positioned in front of the portion having the smallest compression resistance, so that the projection and the sealing element cooperate so as to provide a resistance against axial displacement of the sealing surfaces from the sealing position. (FIG. 1)

20 Claims, 5 Drawing Sheets

SEALING DEVICE

BACKGROUND OF THE INVENTION

The present invention relates to a sealing device comprising two substantially conical or cylindrical sealing surfaces which are axially introducable one into the other to a substantially concentric sealing position in which the sealing surfaces define between themselves an annular sealing space and further comprising a sealing element consisting of elastic material, which is compressed in the sealing space between the sealing surfaces.

Sealing devices of this kind are used for sealing piped-shaped elements in relation to each other, for example for sealing a socket and a spigot end of two pipes connected with each other. It is thereby desirable that the pipe joint shall be simple to mount and that the sealing device shall have sealing position which is well defined. Thus, it is desirable that the sealing element and the sealing surfaces shall cooperate in such a way that the sealing device provides for a resistance against axial displacement of the sealing surfaces from the sealing position. This kind of cooperation between the sealing element and the sealing surfaces provides also that the sealing surfaces are in the final stage of the jointing operation drawn against the sealing position which provides that the correct sealing position is automatically provided. A sealing device providing the resistance against axial displacement of the sealing surfaces from the sealing position as described above and also providing for an axial force striving to displace the sealing surfaces towards the correct sealing position is previously known from for example the Swedish Patent Specification No. 192 569. The sealing device according to this patent specification comprises a sealing ring positioned between the two axially jointable sealing surfaces, the sealing ring rolling between the sealing surfaces when the sealing surfaces are introduced one into the other and being provided with a peripherally extending, pointed projection which provides for an axial fixation of the sealing surfaces in a predetermined sealing position by the fact that the sealing ring has a greater compression resistance in the diametrical plane of the section of the sealing ring in which the projection is positioned. Even if the sealing device according to the Swedish Patent No. 192 569 presents a good function with regard to the capacity of locking the sealing surfaces in relation to each other in the axial direction and to draw the sealing surfaces into the desired sealing position at the final stage of the axial jointing of the sealing surfaces, the device according to said Swedish patent specification has substantial drawbacks. Thus, there is during the course of the jointing operation required an extremely accurate guiding of the two elements on which the sealing surfaces are provided and there is also required a careful cleaning of the sealing surfaces prior to the establishment of the pipe joint.

Also other sealing devices having the capacity of locking the sealing surfaces in the sealing position are previously known but also these prior art sealing devices present drawbacks with regard to their function, high costs and so on.

The object of the invention is to provide a sealing device of the kind discussed above which provides for a good sealing action, a reliable locking of the sealing surfaces in relation to each other, low costs and simple measurements with regard to the jointing operation.

BRIEF SUMMARY OF THE INVENTION

In order to comply with this object the sealing device according to the invention comprises a sealing element compressed in the sealing space between the sealing surfaces and consisting of elastic material ie. a material capable of regaining its shape after a compression load is removed, the sealing element being at least in the axial direction connected with one of the sealing surfaces, the sealing device being characterized in that the second sealing surface is formed with at least one projection and that the sealing element constitutes together with said first sealing surface at least one pair of portions positioned adjacent each other in the axial direction and having different compression resistances under the influence of the projection of the second sealing surface, the projection cooperating in the sealing position with the portion of said pair of portions of the sealing element presenting the lowest compression resistance and the portion of the sealing element having the greatest compression resistance being positioned in front of the portion having the lower compression resistance in the direction of introduction of the sealing surfaces one into the other so that the projection and the sealing element provide by means of their cooperation a resistance against axial displacement of the sealing surfaces from the sealing position.

Preferably the projection is formed as a peripherally extending bead which in axial section has the shape of a half point of an arrow.

In an embodiment of the sealing device according to the invention said first sealing surface is formed with at least one recess which for example can have the form of a peripherally extending groove, the sealing element extending above the recess as well as in front of the recess in the direction of introduction of the sealing surfaces one into the other, the portion of the sealing device positioned above the recess forming the portion of said pair of portions of the sealing element, which constitutes the portion with the lowest compression resistance, said projection engaging the portion of the sealing element which is positioned above the recess.

It is possible also to provide the sealing element with a portion projecting in a direction from said first sealing surface, said portion thereby constituting the portion of the sealing element which presents the greatest compression resistance, the projection of the other sealing surface engaging a portion which in the direction of introduction is positioned behind the projecting portion of the sealing element, said first mentioned portion constituting the portion of the sealing element having the smallest compression resistance.

The sealing device can include one or more, for example two or three, pairs of such portions positioned axially adjacent each other and constituting different compression resistances.

The sealing device according to the invention can with advantage be used for connecting non-socket concrete pipes by the fact that the concrete pipes are formed with spigot ends which are connected with each other by means of a separate socket consisting of plastic material. Thus, there is in this case used two sealing devices according to the invention by the fact that each spigot end of the pipes is connected with the separate socket by means of a sealing device according to the invention. In this case the socket can be designed so that it can be arranged so that the ends of the socket can be arranged in an angular position in relation to each other providing that the pipes connected with each other by means of the socket can be arranged in angular position. When using the sealing device according to the invention as described above for connecting non-socket concrete pipes with each other it is suitable that the socket and the pipes have axially outside the sealing devices the same inner diameters and the same outer diameters so that the pipes and the sealing devices form a continuous surface.

BRIEF DESCRIPTION OF THE DRAWINGS

Some different embodiments of the sealing device according to the invention shall be described in the following with reference to the accompanying drawings.

DETAILED DESCRIPTION

Figure 1:
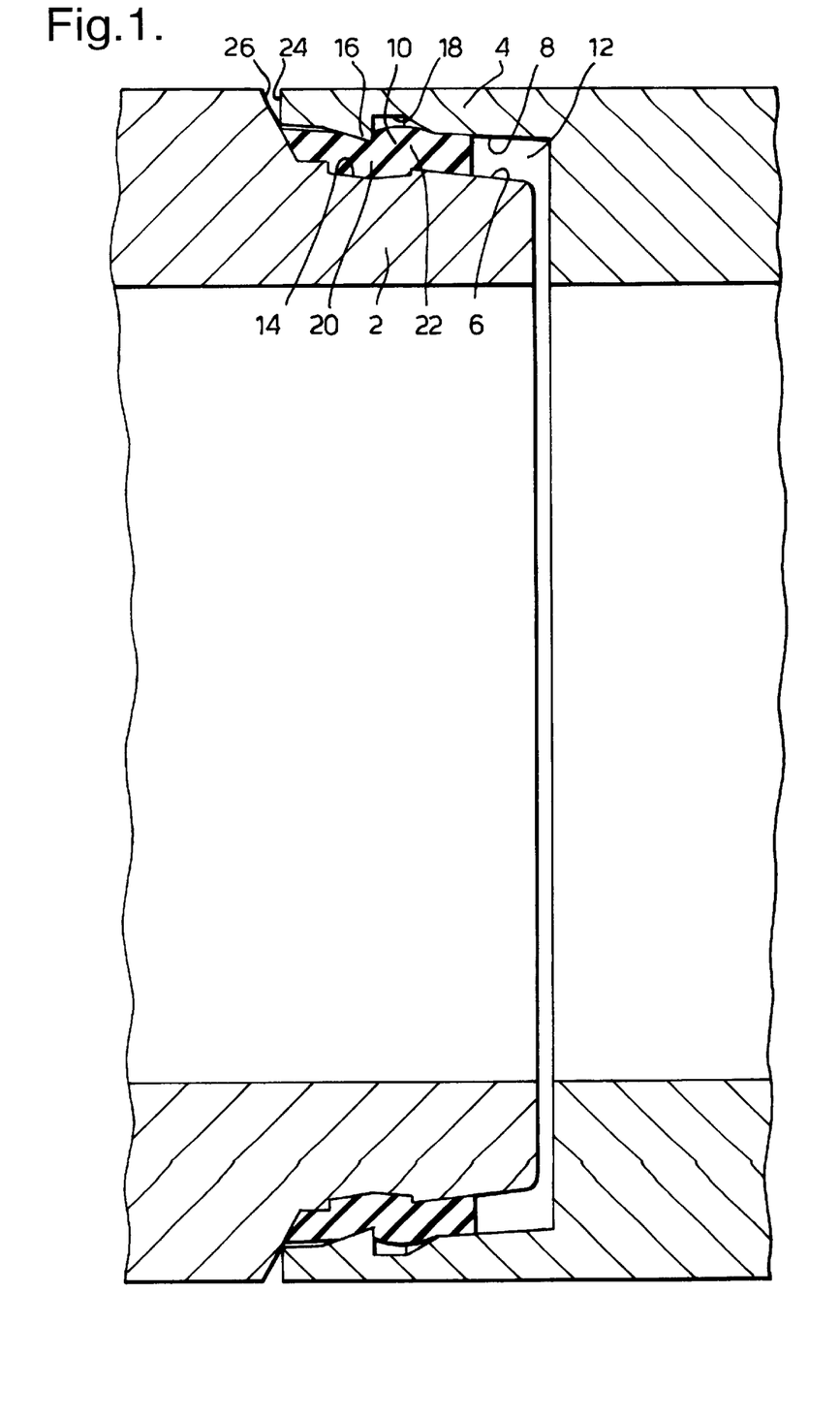
FIG. 1 is an axial section of a pipe joint provided with a sealing device according to the invention.

FIG. 1 shows an axial section of two pipe end portions, one of the pipe end portions constituting a spigot end 2 and the other constituting a socket 4. The spigot end 2 and the socket 4 are sealingly connected with each other by means of a sealing device according to the invention comprising two somewhat conical sealing surfaces 6 and 8 which are substantially concentric in relation to each other and an annular sealing element 10. The sealing surfaces 6 and 8 are axially introducable one into the other from the position shown in FIG. 2 to the position shown in FIG. 1 in which the sealing surfaces 6 and 8 define an annular sealing space 12 in which the sealing element 10 is compressed.

The sealing surface 6 presents a peripherally extending groove 14 in which a part of the sealing element 10 is received. The sealing surface 8 is formed with a peripherally extending projection 16 which as a bead extends around the sealing surface 8 and in axial section has the shape of a half point of an arrow. A peripherally extending groove 18 is formed in the sealing surface 8, and this groove 18 is positioned behind the projection 16 in the direction of introduction of the sealing surfaces 6 and 8 one into the other.

The sealing element 10 forms in cooperation with the sealing surface 6 and the groove 14 formed therein a pair of portions 20 and 22 positioned adjacent each other in the axial direction and having different compression resistances under the influence of the projection 16 of the other sealing surface 8. Thus, the portion 20 will because of the groove 14 present less compression resistance than the portion 22. In the position shown in FIG. 1 in which the sealing surfaces 6 and 8 have been introduced one into the other and which position is the final sealing position the projection 16 engages with the portion 20 of the sealing element 10, which presents less compression resistance which in turn provides that the sealing surfaces 6 and 8 and thereby the spigot end 2 and the socket 4 will in axial direction be subjected to a resistance against displacement of the sealing surfaces of the spigot end and the socket from the sealing position shown in FIG. 1. This is caused by the fact that the resistance against axial displacement increases when the projection 16 is displaced against the portion 22 which presents a higher compression resistance than the portion 20. The groove 18 in the sealing surface 8 formed behind the projection 16 has the object of receiving a portion of the elastic material of the sealing element 10 redistributed from the projection 16.

The sealing element 10 can be tensioned onto the spigot end 2 which before than has been formed with the groove 14. If the pipe end portion constituting the spigot end 2 consists of concrete the sealing element 10 can be used as a mould portion when the pipe end portion is moulded. Thus, the groove 14 will be formed by the sealing element 10 at the same time as the sealing element is moulded into the spigot end 2.

Figure 2:
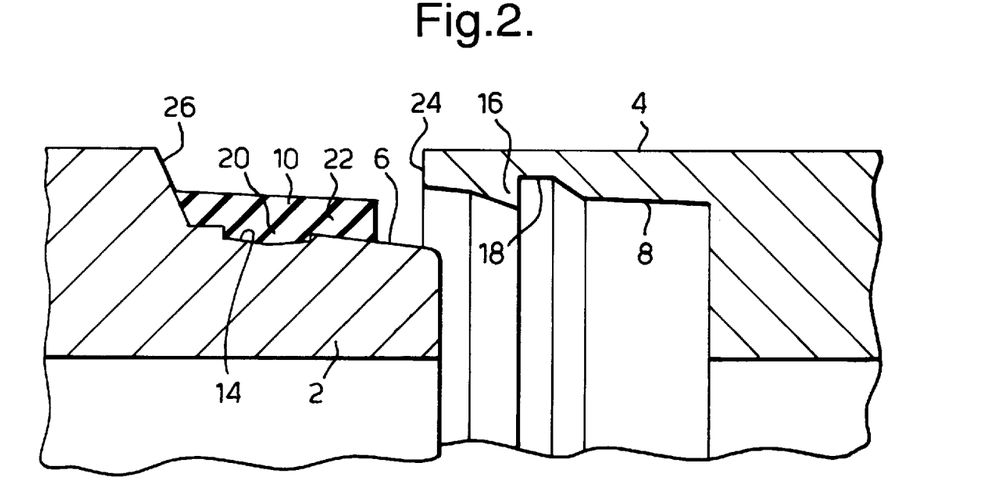
FIG. 2 is an axial section of the parts of the pipe joint shown in FIG. 1 prior to the establishment of the joint.

When providing the pipe joint in an which the sealing device according to the invention is included the spigot end 2 and the socket are displaced from the position shown in FIG. 2 in axial direction, the projection 16 on the sealing surface 8 thereby subjecting the sealing element 10 to a radial compression. Because of the fact that the portion 22 of the sealing element 10 has a greater compression resistance than the portion 20, the spigot end 2 and the socket 4 will be drawn towards the position in which the projection 16 engages with the portion 20 of the sealing element, i.e. towards the final sealing position. This position is defined also by the engagement between the transversely extending end surface 24 of the socket 4 and the transversely extending surface 26 of the spigot end. As appears from FIG. 2, the sealing element 10 forms a substantially smooth outer surface prior to the establishment of the pipe joint which is advantageous with regard to the fact that the risk for collection of dirt and the like on the spigot end is thereby obviated.

Figure 3:
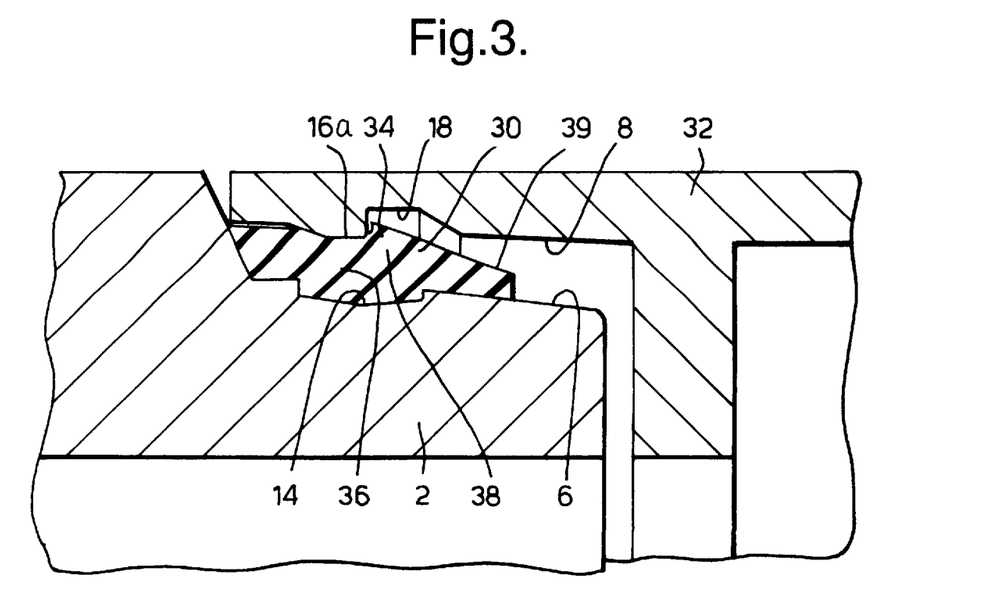
FIG. 3 is a somewhat modified embodiment of a sealing device according to the invention included in a pipe joint.
Figure 4:
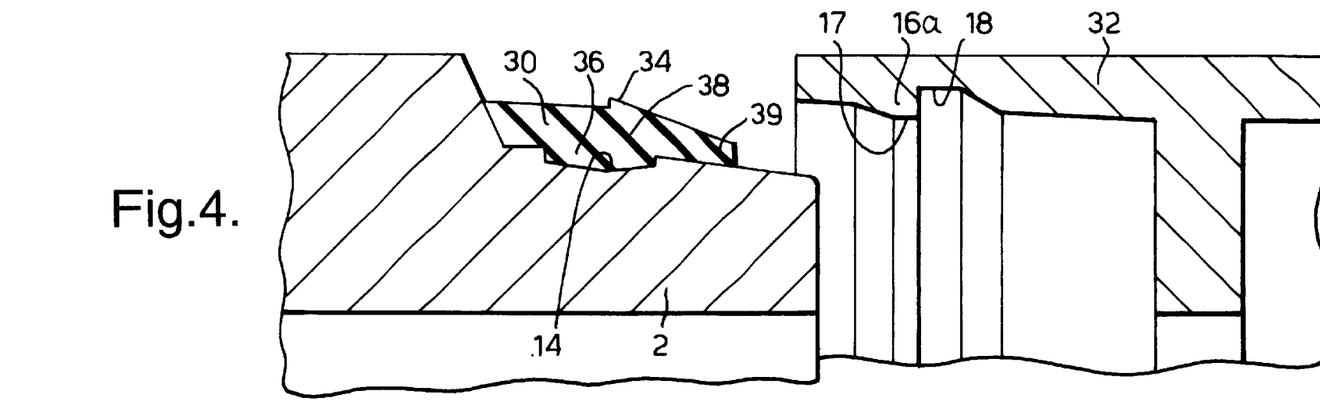
FIG. 4 shows the parts of the pipe joint according to FIG. 3 prior to the establishment of the joint.

In FIGS. 3 and 4 there is shown an axial section of a spigot end 2 of a pipe having a sealing surface 6 of the same design as the sealing surface 6 of the embodiment according to FIGS. 1 and 2. Thus, the sealing surface 6 is in the embodiment according to FIGS. 3 and 4 provided with a peripherally extending groove 14 receiving a portion of an annular sealing element 30 connected with the sealing surface 6. In the embodiment according to FIGS. 3 and 4 the sealing device according to the invention is positioned between the spigot end 2 and a socket 32 consisting of a plastic material, for example cross-linked polyethylene, the sealing surface 8 of the socket being designed in substantially the same way as the sealing surface 8 of the socket according to FIGS. 1 and 2, i.e. the sealing surface 8 has a peripherally extending projection 16a and a peripherally extending groove 18 positioned beside the projection. The embodiment according to FIGS. 3 and 4 differs from the embodiment according to FIGS. 1 and 2 with regard to the design of the sealing surface 8 in the respect that the projection 16a has at its inner surface a cylindrical portion 17 having for example a size of 5 mm in the axial direction.

The sealing element 30 according to FIGS. 3 and 4 differs from the sealing element 10 according to FIGS. 1 and 2 in the respect that the sealing element 30 is at its outer peripheral surface formed with a peripherally extending projection 34. The sealing element 30 forms two portions 36 and 38 positioned beside each other in the axial direction, the portion 36 presenting less compression resistance than the portion 38 under the influence of the projection 16 on the sealing surface 8. The compression resistance of the portion 38 is reinforced by the existence of the projection 34 which further improves the locking effect of the sealing device in the sealing position shown in FIG. 3.

The sealing element 30 differs from the sealing element 10 also in the respect that the sealing element 30 has at its front edge portion 39 conically decreasing diameter. This makes it possible to arrange the spigot end 2 in an angular position in relation to the socket 32 with up to for example 5°. It is also possible to design the sealing element 30 so that edge portion 39 consists of harder rubber than the rest of the sealing element 30 or consists of plastic material. This provides for an improved guiding when the joint is mounted at the same time as the locking effect in the sealing position is improved by the fact that the redistribution of the rubber material in the portion 38 is obstructed when it is attempted to disassemble the joint.

Figure 5:
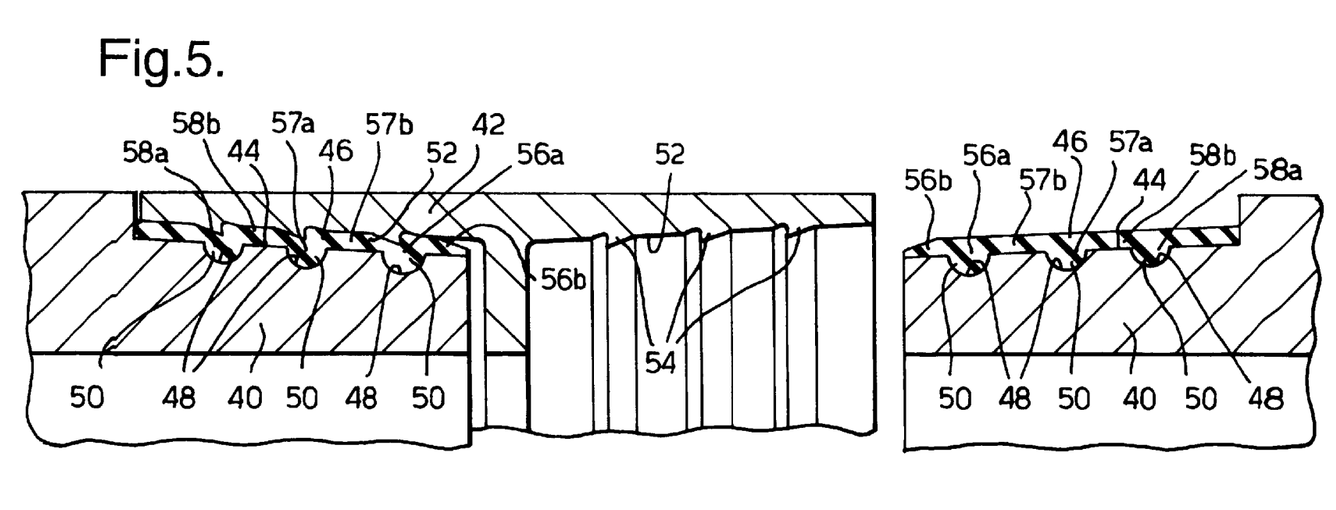
FIG. 5 is an axial section of two pipe end portions and a double socket for connecting the pipe end portions in which the socket and the pipe end portions are connected with each other by means of sealing devices according to the invention.

FIG. 5 shows an axial section of the end positions of two non-socket concrete pipes provided with spigot ends 40. The spigot ends 40 are adapted to be connected with each other by means of a double socket 42 consisting of plastic material while using two sealing devices according to the invention. The spigot ends 40 constitute one sealing surface 44 each, and each sealing surface 44 supports a sealing element 46 in the form of an annular sleeve consisting of elastic material, preferably rubber. The sealing surfaces 44 are each formed with three peripherally extending grooves 48 having half-circular cross-sectional shape, and the sealing elements 46 are formed with corresponding, peripherally extending, bead-shaped projections 50 engaging and filling out the grooves 48.

The double socket 42 forms two sealing surfaces 52 each formed with three peripherally extending projections 54 having an axial section in the form of a half point an arrow. The projections 54 are arranged on the sealing surface 52 in such a way that they are subsequently to the establishment of the pipe joint positioned opposite to the grooves 48 in the sealing surface 44. Each sealing element 46 forms three pairs of portions 56a, 56b; 57a, 57b and 58a, 58b positioned adjacent each other in the axial direction, said portions of each pair constituting different compression resistances under the influence of the projection 54 of the sealing surface 52. Thus, this means that the portions 56a, 57a and 58a have a smaller compression resistance than the portions 56b, 57b and 58b. In the sealing position of the sealing device the projection 54 of the sealing surface 52 engages the portions 56a, 57a and 58a of the sealing element 46 having the smallest compression resistance which means that the projection 54 and the sealing element 46 cooperate so as to constitute a resistance against axial displacement of the sealing surfaces from the sealing position. As shown in the drawing, the sealing surface 52 is suitably provided with peripherally extending grooves positioned behind the projections 54 for receiving the elastic material of the sealing element 46, forced away by the projections 54.

As mentioned, the double socket 42 is manufactured from plastic material and has substantially the same outer diameter and inner diameter as the pipes on which the spigot ends 40 are provided. Thus, the pipes and the socket 42 constitute in the mounted position a continuous unit without any projecting portions or recesses.

Figure 6:
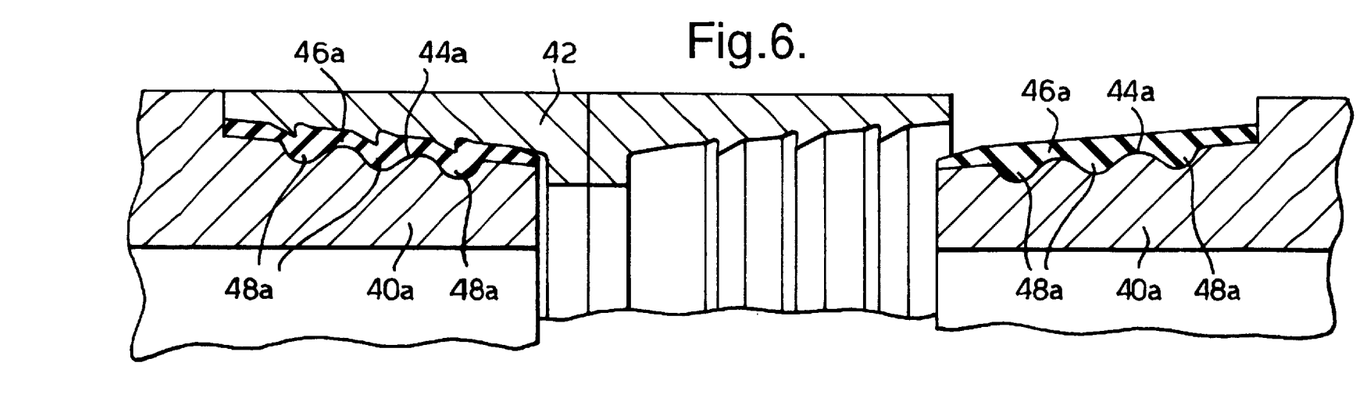
FIG. 6 is an axial section corresponding to FIG. 5 showing two pipe end portions and a double socket having a somewhat modified embodiment of sealing devices according to the invention.

The embodiment of the sealing device according to the invention as shown in FIG. 6 is in substantially agreement with the embodiment according to FIG. 5. Thus, also in this embodiment the sealing devices are included in the spigot ends 40a of two concrete pipes and the spigot ends are connected with each other by means of a double socket 42 consisting of plastic material. The difference between the sealing devices of the embodiment according to FIG. 6 and the sealing devices in the embodiment of FIG. 5 is represented by the design of the sealing surfaces 44a which in the embodiment according to FIG. 6 forms in axial section a continuous curve without sharp edges. Thus, this curve forms the peripherally extending recesses 48a receiving the portions of the sealing element 46a having the small compression resistance.

Figure 7:
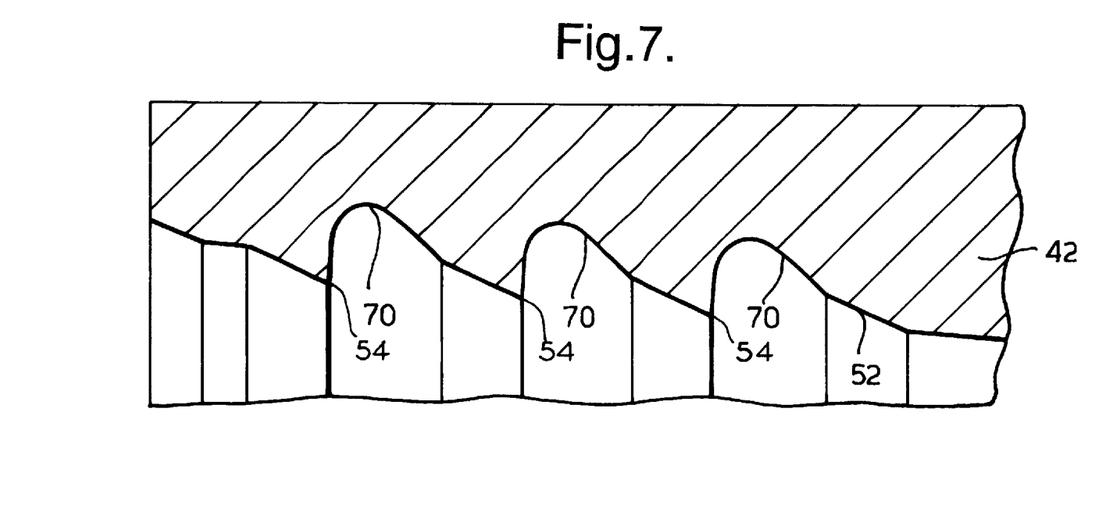
FIGS. 7 and 8 illustrate different embodiments of annular projections included in the sealing device according to the invention.
Figure 8:
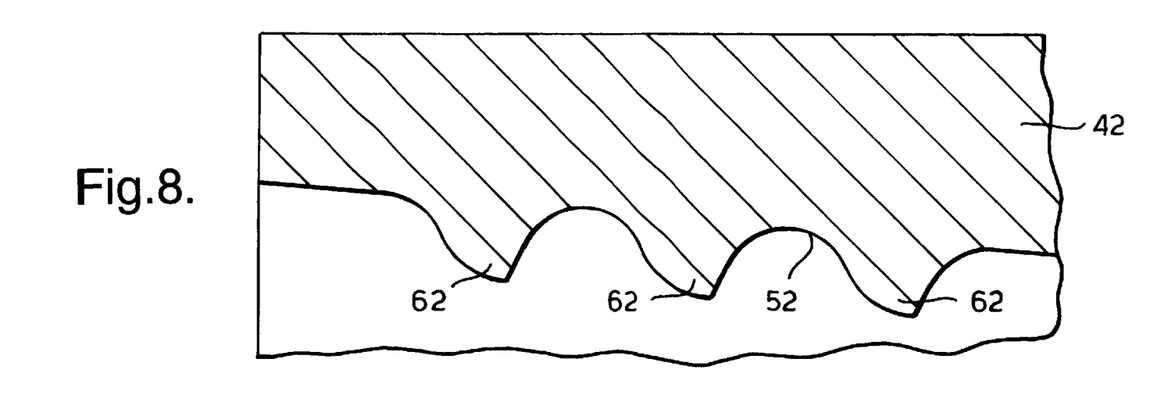

FIGS. 7 and 8 show axial sections of a somewhat modified embodiment of the sealing surfaces 52 of the double sockets 42 shown in FIGS. 5 and 6. Thus, grooves 70 are formed behind each of the projections 54 in the sealing surface 52 in the embodiment according to FIG. 7. These grooves can be considered to have the same function as the groove 18 in the embodiments according to FIGS. 1–4.

In the embodiment according to FIG. 8 the projections 62 arranged at the sealing surface 52 are formed with a somewhat convex outer surface instead of with a substantially conical outer surface.

Figure 9:
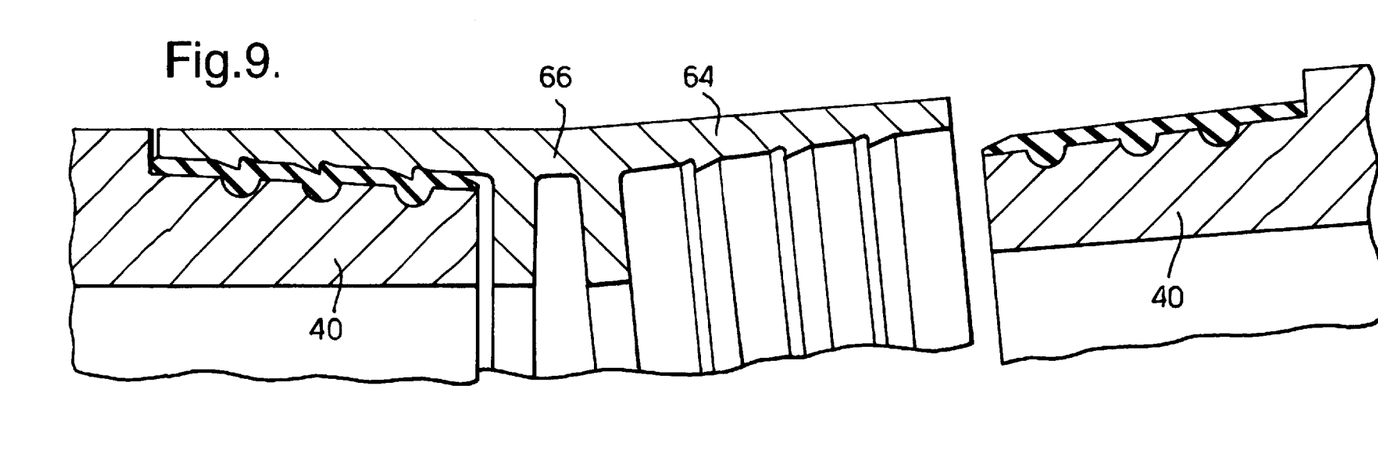
FIG. 9 is an axial section corresponding to FIGS. 5 and 6 showing two pipe end portions and a double socket which can be arranged in an angular position.

The embodiment of the sealing device is according to the invention shown in FIG. 9 is in exact agreement with the embodiment according to FIG. 5. However, the double socket 64 for connecting the two spigot ends 40 of the concrete pipes is provided with a central portion 66 which is adjustable with regard to its angular position so that the spigot ends 40 can be connected with each other at a certain angular position in relation to each other, for example 5°.

The invention can be modified within the scope of the following claims. It is for example possible to provide the portions having different compression resistances by manufacturing these portions from materials of different hardnesses.

What is claimed is:

1. A sealing device comprising: two substantially conical or cylindrical sealing surfaces which are introducable one into the other in an axial direction so as to define a substantially concentrical sealing position in which the sealing surfaces define between themselves an annular sealing space; a sealing element consisting essentially of an elastic material compressed in the sealing space between the sealing surfaces and bound at least in an axial direction to a first of said sealing surfaces wherein a second sealing surface of said sealing surfaces is formed with at least one projection, the sealing element constituting in cooperation with said first sealing surface at least one pair of portions positioned adjacent each other in an axial direction which, under the influence of the projection of said second sealing surface, present different compression resistances, said projection cooperating with a portion of said pair of portions of the sealing element having the smallest compression resistance; a portion of the sealing element having the greatest compression resistance being positioned in front of the portion having the smallest compression resistance in the direction of introduction of the sealing surfaces one into the other so that said projection and the sealing element provide by means of their cooperation a resistance against axial displacement of the sealing surfaces from the sealing position.

2. A sealing device as claimed in claim 1, wherein the projection has an axial section in the shape of a half point of an arrow.

3. A sealing device as claimed in claim 2, wherein the projection has the shape of a peripherally extending bead.

4. A sealing device as claimed in claim 3, wherein said first sealing surface includes a groove positioned behind the projection in the direction of introduction of the sealing surfaces one into the other.

5. A sealing device as claimed in claim 1, wherein said first sealing surface is formed with at least one recess, that the sealing element extends above the recess as well as in front of the recess in the direction of introduction of the sealing surfaces one into the other, the portion of the sealing device positioned above the recess forming the portion of said pair of portions of the sealing element having the smallest compression resistance, and that the projection formed at said second sealing surface engages the portion of the sealing element positioned over the recess.

6. A sealing device as claimed in claim 5, wherein the sealing element fills up the recess in said first sealing surface.

7. A sealing device as claimed in claim 1, wherein the sealing element is formed with a portion projecting in a direction from said first sealing surface and constituting the portion of said pair of portions of the sealing element having the greatest compression resistance and that the projection of said second sealing surface in the direction of introduction of the sealing surfaces one into the other engages a portion of a sealing element positioned behind said projecting portion of the sealing element, the last mentioned portion constituting the portion of the sealing element of said pair of portions having the smallest compression resistance.

8. A sealing device as claimed in claim 1, wherein said second sealing surface is formed with two or more projections positioned axially after each other and that the sealing element includes a corresponding number of portions having different compression resistances, said portions being adapted to cooperate with said projections.

9. A sealing device as claimed in claim 1, wherein the sealing surfaces are constituted by the outer surface of a spigot end and the inner surface of a socket.

10. A sealing device as claimed in claim 9, wherein the sealing device is positioned at the outer surface of the spigot end and that the projection is positioned at the inner surface of the socket.

11. A sealing device as claimed in claim 1, wherein the sealing device is positioned at both ends of a socket and at the spigot ends of two pipes connected with the socket.

12. A sealing device as claimed in claim 11, wherein the socket is adjustable with regard to its angular position between its two ends so as to allow that the pipes connected with the socket are angularly positioned in relation to each other.

13. A sealing device as claimed in claims 9, wherein the socket and the pipes have the same inner diameter and the same outer diameter axially outside the sealing devices.

14. A sealing device as claimed in claim 1, further comprising surfaces extending transversely in relation to the direction of introduction of the sealing surfaces one into the other for redefining the sealing position of the sealing surfaces.

15. A sealing device as claimed in claim 1, wherein the sealing element forms a substantially smooth surface at a side of said sealing element turned from said first sealing surface.

16. A sealing device as claimed in claim 1, wherein said first sealing surface includes a groove positoned behind the projection in the direction of introduction of the sealing surfaces one into the other.

17. A sealing device as claimed in claim 10, wherein the socket and the pipe has the same inner diameter and the same outer diameter axially outside the sealing device.

18. A sealing device as claimed in claim 2, wherein the sealing element forms a substantially smooth surface at a side of said sealing element turned from said first sealing surface.

19. A sealing device as claimed in claim 3, wherein the sealing element forms a substantially smooth surface at its side turned from said first sealing surface.

20. A sealing device as claimed in claim 4, wherein the sealing element forms a substantially smooth surface at a side of said sealing element turned from said first sealing surface.

* * * * *

UNITED STATES PATENT AND TRADEMARK OFFICE
CERTIFICATE OF CORRECTION

PATENT NO. : 6,193,238 B1
DATED : February 27, 2001
INVENTOR(S) : Sten Spore

It is certified that error appears in the above-identified patent and that said Letters Patent is hereby corrected as shown below:

<u>Column 8, claim 14,</u>
Line 15, delete "redefining" and substitute therefor -- defining --

Signed and Sealed this

Second Day of October, 2001

*Attest:*

NICHOLAS P. GODICI
*Attesting Officer*     *Acting Director of the United States Patent and Trademark Office*